United States Patent
Padala et al.

(10) Patent No.: US 9,412,075 B2
(45) Date of Patent: Aug. 9, 2016

(54) AUTOMATED SCALING OF MULTI-TIER APPLICATIONS USING REINFORCED LEARNING

(71) Applicant: VMware, Inc., Palo Alto, CA (US)

(72) Inventors: Pradeep Padala, Sunnyvale, CA (US); Aashish Parikh, Santa Clara, CA (US); Zhefu Jiang, Qingdao (CN)

(73) Assignee: VMware, Inc., Palo Alto, CA (US)

( * ) Notice: Subject to any disclaimer, the term of this patent is extended or adjusted under 35 U.S.C. 154(b) by 239 days.

(21) Appl. No.: 13/975,239

(22) Filed: Aug. 23, 2013

(65) Prior Publication Data

US 2015/0058265 A1   Feb. 26, 2015

(51) Int. Cl.
G06F 15/18 (2006.01)
G06N 99/00 (2010.01)

(52) U.S. Cl.
CPC ................................... G06N 99/005 (2013.01)

(58) Field of Classification Search
USPC ............................................................ 706/12
See application file for complete search history.

(56) References Cited

U.S. PATENT DOCUMENTS

| | | | | |
|---|---|---|---|---|
| 8,271,814 | B2 * | 9/2012 | Padmanabhan | G06F 1/3209 713/310 |
| 8,767,535 | B2 * | 7/2014 | Uysal | H04L 41/5003 370/230 |
| 8,918,566 | B2 * | 12/2014 | Padala | G06F 3/061 710/36 |
| 8,930,948 | B2 * | 1/2015 | Shanmuganathan | G06F 9/4856 718/1 |
| 9,081,622 | B2 * | 7/2015 | Padala | G06F 9/5072 |
| 9,223,608 | B2 * | 12/2015 | Padala | G06F 9/5077 |
| 9,274,834 | B2 * | 3/2016 | Parikh | G06F 9/50 |
| 2010/0023307 | A1 * | 1/2010 | Lee et al. | 703/7 |
| 2012/0089967 | A1 * | 4/2012 | Varadarajan et al. | 717/136 |
| 2013/0185729 | A1 * | 7/2013 | Vasic et al. | 718/104 |

OTHER PUBLICATIONS

Ramachandran, "Bayesian Inverse Reinforcement Learning" IJCAI, pp. 2586-2591, 2007.*
Elastic and Efficient Virtual Network Provisioning for Cloud-Based Multi-tier Applications M. Shen; K. Xu; F. Li; K. Yang; L. Zhu; L. Guan Parallel Processing (ICPP), 2015 44th International Conference on Year: 2015 pp. 929-938, DOI: 10.1109/ICPP.2015.102 IEEE Conference Publications.*
Minimalistic Adaptive Resource Management for Multi-tier Applications Hosted on Clouds W. Iqbal Parallel and Distributed Processing Symposium Workshops & PhD Forum (IPDPSW), 2012 IEEE 26th International Year: 2012 pp. 2546-2549, DOI: 10.1109/IPDPSW.2012.323 IEEE Conference Publications.*

(Continued)

*Primary Examiner* — Michael B Holmes (57) ABSTRACT

A module and method for automatically scaling a multi-tier application, wherein each tier of the multi-tier application is supported by at least one virtual machine, selects one of reinforced learning and heuristic operation based on a policy to recommend a scaling action from a current state of the multi-tier application. If reinforced learning is selected, the reinforced learning is applied to select the scaling action from a plurality of possible actions for the multi-tier application in the current state. If heuristic operation is selected, the heuristic operation is applied to select the scaling action using a plurality of defined heuristics.

27 Claims, 9 Drawing Sheets

(56) References Cited

OTHER PUBLICATIONS

Migration of Multi-tier Applications to Infrastructure-as-a-Service Clouds: An Investigation Using Kernel-Based Virtual Machines W. Lloyd; S. Pallickara; O. David; J. Lyon; M. Arabi; K. Rojas Grid Computing (GRID), 2011 12th IEEE/ACM International Conference on Year: 2011 pp. 137-144, DOI: 10.1109/Grid.2011.26 IEEE.*
Amazon CloudWatch; http://aws.amazon.com/cloudwatch; accessed Feb. 6, 2014.
Amazon EC2; http://aws.amazon.com/ec2; accessed Feb. 6, 2014.
Animoto—Scaling Through Viral Growth; http://aws.typepad.com/aws/2008/04/animoto---scali.html; accessed Feb. 6, 2014.
Cloud Computing System Architecture Diagrams; http://support.rightscale.com/12-Guides/EC2_Best_Practices/EC2_Site_Architecture_Diagrams, via archive.org; accessed Feb. 6, 2014.
Decision Tree Learning; http://en.wikipedia.org/wiki/Decision_tree_learning; accessed Feb. 6, 2014.
Galera Cluster for MySQL, http://www.codership.com/content/using-galera-cluster; accessed Feb. 6, 2014.
Set up autoscaling using voting tags; http://support.rightscale.com/12-Guides/Dashboard_Users_Guide/Manage/Arrays/Actions/Set_up_Autoscaling_using_Voting_Tags; accessed Feb. 6, 2014.
"View Storage Accelerator in VMware View 5.1"; Technical White Paper; Oct. 8, 2012; http://www.vmware.com/files/pdf/techpaper/vmware-view-storage-accelerator-host-caching-content-based-read-cache.pdf.
VMware Hyperic; http://www.hyperic.com/; accessed Feb. 6, 2014.
VMware vCenter; http://www.vmware.com/products/vcenter-server/; accessed Feb. 6, 2014.
VMware vSphere Web Services SDK; https://www.vmware.com/support/developer/vc-sdk/; accessed Feb. 6, 2014.
Amza, C., CH, A., Cox, A. L., Elnikety, S., Gil, R., Rajamani, K., Cecchet, E., and Marguerite, J.; "Specification and implementation of dynamic Web site benchmarks"; In Proc. of IEEE Workshop on Workload Characterization (Oct. 2002).
Arlitt, M., and Jin, T.; "Workload characterization of the 1998 world cup web site"; Tech. Rep. HPL-1999-35R1, Hewlett Packard Laboratories, Feb. 1, 1999.
Aron, M., Sanders, D., Druschel, P., and Zwaenepoel, W.; "Scalable content-aware request distribution in cluster-based network servers"; In Proceedings of the 2000 USENIX Annual Technical Conference (Jun. 18-23, 2000), pp. 323-336.
Bodik, P., Fox, A., Franklin, M. J., Jordan, M. I., and Patterson, D. A.; "Characterizing, modeling, and generating workload spikes for stateful services"; In SoCC (2010), pp. 241-252.
Brisco, T. RFC 1794; "DNS support for load balancing"; Apr. 1995. Status: Informational.
Cherkasova, L., and Phaal, P. Session-based admission control: A mechanism for peak load management of commercial web sites. IEEE Trans. Computers 51, 6 (2002), 669-685.
Crites, R. H., and Barto, A. G.; "Improving elevator performance using reinforcement learning"; In Advances in Neural Information Processing Systems 8 (1996), D. S. Touretzky, M. C. Mozer, and M. E. Hasselmo, Eds.
Doyle, R. P., Chase, J. S., Asad, O. M., Jin, W., and Vahdat, A.; "Model-based resource provisioning in a web service utility"; In USENIX Symposium on Internet Technologies and Systems (2003).
Lagar-Cavilla, H. A., Whitney, J. A., Scannell, A., Patchin, P., Rumble, S. M., De Lara, E., Brudno, M., and Satyanarayanan, M.; "Snowflock: Rapid virtual machine cloning for cloud computing"; In Proc. 4th EuroSys Conf. (4th EuroSys'09) (Nuremberg, Germany, Apr. 2009), ACM SIGOPS, pp. 1-12.
Li, K., and Jamin, S.; "A measurement-based admission-controlled web server"; In INFOCOM (2000), pp. 651-659.
Malkowski, S., Hedwig, M., and Pu, C.; "Experimental evaluation of N-tier systems: Observation and analysis of multi-bottlenecks"; In IISWC (2009), IEEE, pp. 118-127.
Ng, A. Y., and Jordan, M.; "PEGASUS: A policy search method for large MDPs and POMDPs"; In Proceedings of the 16th Conference on Uncertainty in Artificial Intelligence (UAI-00) (SF, CA, Jun. 30-Jul. 3, 2000), C. Boutilier and M. Goldszmidt, Eds., Morgan Kaufmann Publishers, pp. 406-415.
Padala, P., Hou, K.-Y., Shin, K. G., Zhu, X., Uysal, M., Wang, Z., Singhal, S., and Merchant, A.; "Automated control of multiple virtualized resources"; In EuroSys (2009), pp. 13-26.
Pai, V. S., Aron, M., Banga, G., Svendsen, M., Druschel, P., Zwaenepoel, W., and Nahum, E.; "Locality-aware request distribution in cluster-based network servers"; In Proceedings of the Architectural Support for Programming Languages and Operating Systems (Oct. 3-7, 1998), pp. 205-216.
Quinlan, R.; "Induction of decision trees"; Machine Learning 1 (1986), 81-106.
Smart, W. D., and Kaelbling, L. P.; "Effective reinforcement learning for mobile robots"; In ICRA (2002), IEEE, pp. 3404-3410.
Sutton, R. S., and Barto, A. G. Reinforcement Learning: An Introduction. The MIT Press, 1998.
Tesauro, G.; "Temporal difference learning and TD-gammon"; Communications of the ACM 38, 3 (1995), 58-68.
Trushkowsky, B., Bodik, P., Fox, A., Franklin, M. J., Jordan, M. I., and Patterson, D. A.; "The SCADS director: Scaling a distributed storage system under stringent performance requirements"; In FAST (2011), G. R. Ganger and J. Wilkes, Eds., USENIX, pp. 163-176.
Urgaonkar, B., Pacific, G., Shenoy, P. J., Spreitzer, M., and Tantawi, A. N.; "An analytical model for multi-tier internet services and its applications"; In Proceedings of the International Conference on Measurements and Modeling of Computer Systems (Jun. 2005), pp. 291-302.
Urgaonkar, B., Shenoy, P. J., Chandra, A., and Goyal, P.; "Dynamic provisioning of multi-tier internet applications"; In Proc. of International Conference on Autonomic Computing (ICAC) (2005), pp. 217-228.
Watkins, C.; "Learning from delayed rewards"; PhD thesis, Cambridge University, Psychology Dept., 1989.
Zhang, W., and Dietterich, T. G.; "A reinforcement learning approach to job-shop scheduling"; In Proceedings of the International Joint Conference on Artificial Intelligence (1995).

* cited by examiner

AUTOMATED SCALING OF MULTI-TIER APPLICATIONS USING REINFORCED LEARNING

BACKGROUND

A virtual data center is implemented using entities such as physical hosts and storage devices that are connected to each other via one or more networks. Running on the physical hosts are virtual machines, which execute one or applications. The performance of these applications depends on the number of the entities supporting the virtual data center and their configurations, as well as the workload on the applications. In order to meet SLOs of the applications, the virtual machines executing the applications need to be able to handle the changing workload on the applications.

Elasticity is an important feature of virtual data centers. Elasticity refers to the ability to scale in or out virtual machines executing the applications to handle changing workload conditions. Typically, a virtual data center provides scaling based on resource usage thresholds set by a user. These thresholds are static values determined, generally, at the initialization of the virtual data center. The thresholds are commonly based on specific resource usage conditions on the virtual machines (e.g., average processor usage >70%), and are set by the user. However, scaling based on virtual machine resource usage is not sufficient to scale multi-tier applications. Additionally, applications that involve multiple tiers often have complicated dependencies, further complicating a determination of which tier and resource (CPU, memory, storage etc.) to scale.

SUMMARY

A module and method for automatically scaling a multi-tier application, wherein each tier of the multi-tier application is supported by at least one virtual machine, selects one of reinforced learning and heuristic operation based on a policy to recommend a scaling action from a current state of the multi-tier application. If reinforced learning is selected, the reinforced learning is applied to select the scaling action from a plurality of possible actions for the multi-tier application in the current state. If heuristic operation is selected, the heuristic operation is applied to select the scaling action using a plurality of defined heuristics.

A method for automatically scaling a multi-tier application in accordance with an embodiment of the invention comprises (1) receiving operational metrics of the multi-tier application from virtual machines executing the multi-tier application, wherein each tier of the multi-tier application is supported by at least one virtual machine, (2) selecting one of reinforced learning and heuristic operation to recommend a scaling action from a current state of the multi-tier application, the current state of the multi-tier application being dependent on the operational metrics, (3) if the reinforced learning is selected, applying the reinforced learning to select the scaling action from a plurality of possible actions for the multi-tier application in the current state, and (4) if the heuristic operation is selected, applying the heuristic operation to select the scaling action using a plurality of defined heuristics. In some embodiments, the steps of this method are performed when program instructions contained in a computer-readable storage medium is executed by one or more processors of the host computers. In some embodiments, the steps of this method are performed when program instructions contained in a computer-readable storage medium are executed by one or more processors.

An automatic scaling module for a multi-tier application executed on a distributed computer system, wherein each tier of the multi-tier application is supported by at least one virtual machine, in accordance with an embodiment of the invention comprises a selector, a reinforced learning module and a heuristic operation module. The selector is configured to select one of reinforced learning and heuristic operation to recommend a scaling action from a current state of the multi-tier application. The reinforced learning module is configured to apply the reinforced learning to select the scaling action from a plurality of possible actions for the multi-tier application in the current state when the reinforced learning is selected. The heuristic operation module is configured to apply the heuristic operation to select the scaling action using a plurality of defined heuristics when the heuristic operation is selected.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
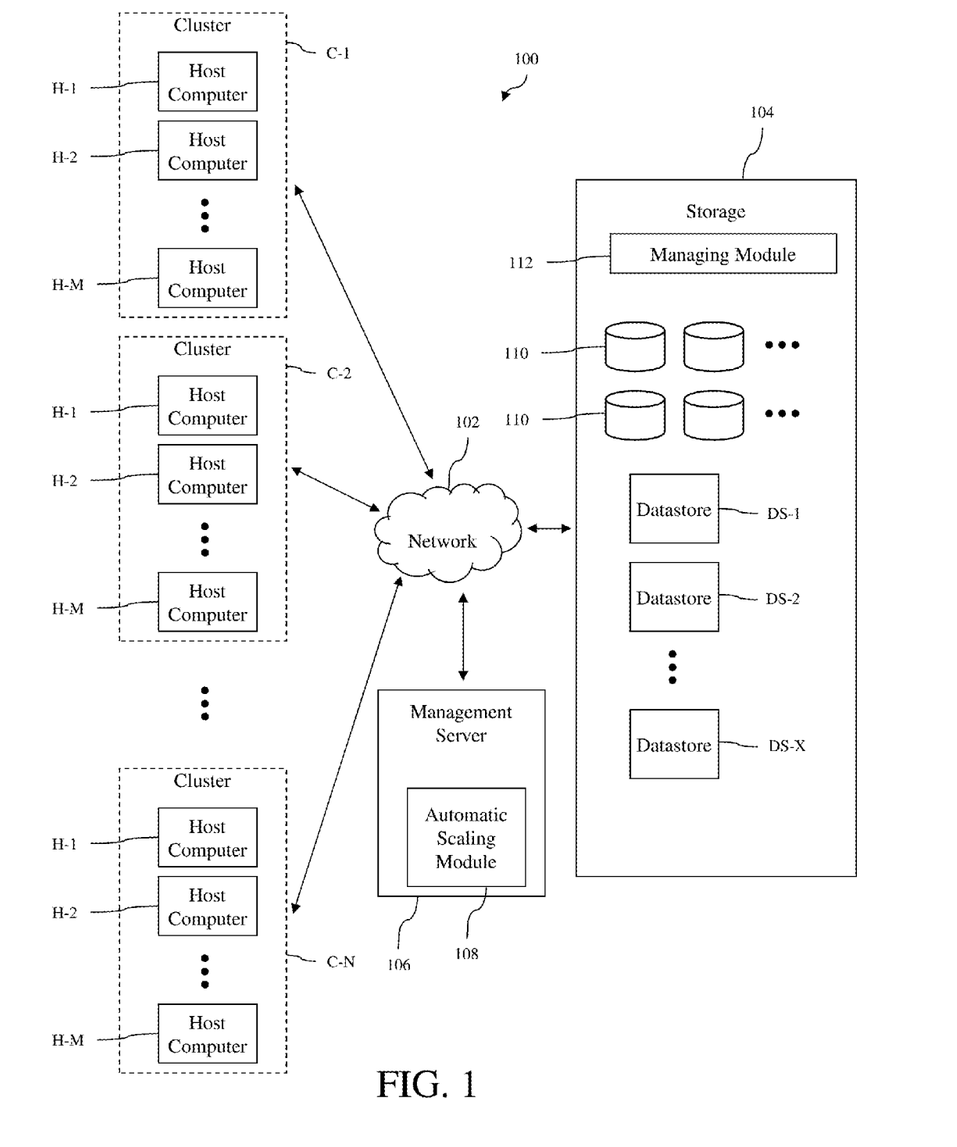
FIG. 1 is a block diagram of a distributed computer system in accordance with an embodiment of the invention.

Turning now to FIG. 1, a distributed computer system 100 that provides a cloud computing environment in accordance with an embodiment of the invention is shown. The distributed computer system may be, for example, a computer network system. As shown in FIG. 1, the distributed computer system includes a network 102, clusters C-1, C-2 . . . C-N of host computers (where N is a positive integer), storage 104 and a management server 106 with an automatic scaling module 108. The exact number of host computer clusters included in the distributed computer system can be any number of clusters from one to tens of clusters or more. The host computers of the different clusters, the storage and the management server are connected to the network. Thus, each of the host computers in the clusters and the management server are able to access the storage via the network and may share the resources provided by the storage. Consequently, any process running on any of the host computers and the management server may also access the storage via the network.

In the illustrated embodiment, each of the clusters C-1, C-2 . . . C-N includes a number of host computers H-1, H-2 . . . H-M (where M is a positive integer). The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in data centers. As an example, the host computers may be servers installed in one or more server racks. Typically, the host computers of a cluster are located within the same server rack.

Figure 2:
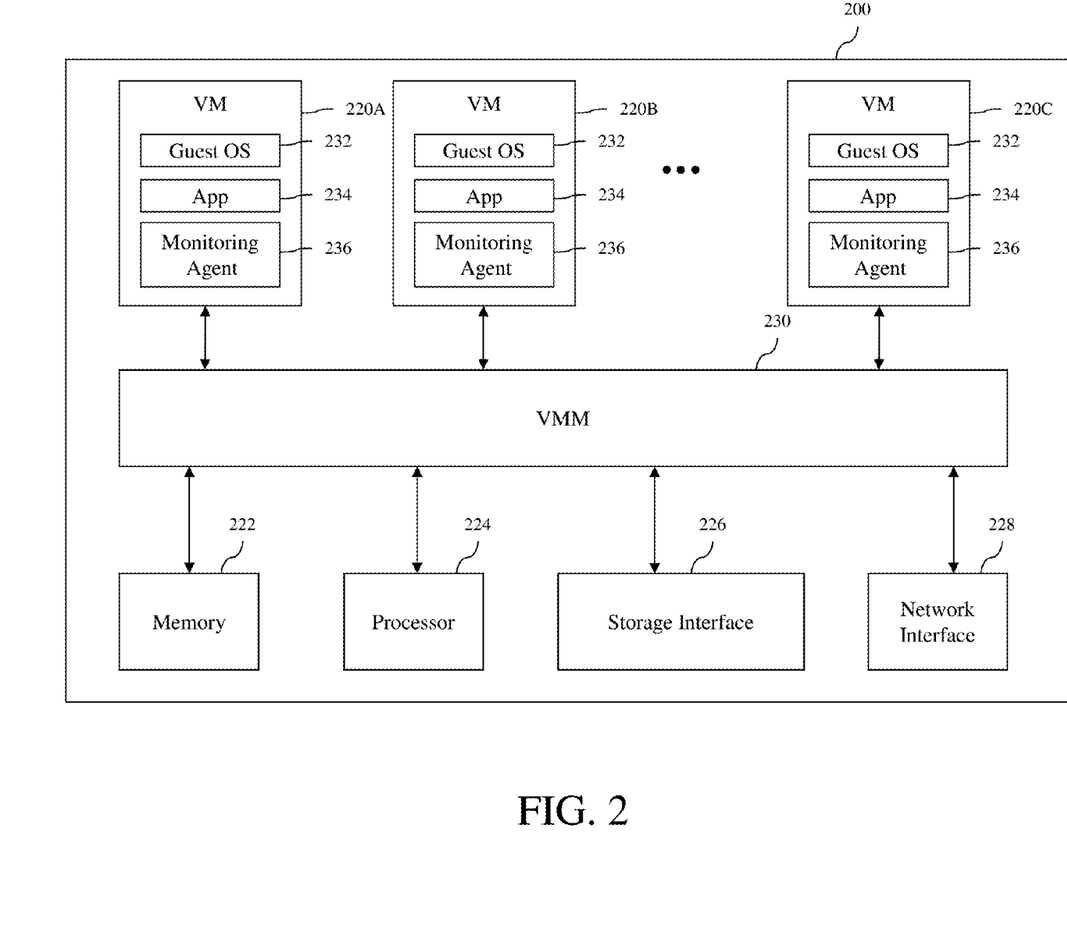
FIG. 2 is a block diagram of a host computer in accordance with an embodiment of the invention.

Turning now to FIG. 2, components of a host computer 200 that is representative of the host computers H-1, H-2 . . . H-M in the clusters C-1, C-2 . . . C-N in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory, which may be random access memory (RAM), is the primary memory of the host computer. The processor can be any type of a processor, such as a central processing unit (CPU) commonly found in a server. The storage interface is an interface that allows that host computer to communicate with the storage 104. As an example, the storage interface may be a host bus adapter or a network file system interface. The network interface is an interface that allows the host computer to communicate with other devices connected to the network 102. As an example, the network interface may be a network adapter.

In the illustrated embodiment, the VMs 220A, 220B . . . 220L run on top of a virtual machine monitor (VMM) 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system (OS) 232, one or more guest applications (APP) 234 and a monitoring agent 236. The guest operating system is a master control program of the respective VM and, among other things, the guest operating system forms a software platform on top of which the guest applications run. The monitoring agent is a software program running in the VM to monitor and report resource metrics for that VM to the automatic scaling module 108 in the management server 106. These resource metrics reflect availability, performance, utilization, and throughput for each resource type being monitored, such as CPU, memory, storage and network. In an embodiment, the monitoring agent is a Hyperic Agent that reports to a Hyperic Server, which is included in the automatic scaling module.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer. Thus, the applications 234 and the monitoring modules 236 of the VMs are capable of communicating with other entities connected to the network.

Turning back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and Hyper-SCSI.

The storage 104 is used to store data for the host computers H-1, H-2 ... H-M of the clusters C-1, C-2 ... C-N, which can be accessed like any other storage device connected to computer systems. In an embodiment, the storage can be accessed by entities, such as clients (e.g., VMs) running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 ... DS-X (where X is an integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters. For virtual machines, the datastores may be used to store virtual storage, e.g., virtual disks, used by each of the virtual machines, as well as other files needed to support the virtual machines. One or more datastores may be associated with one or more host computers. Thus, each host computer is associated with at least one datastore. Some of the datastores may be grouped into one or more clusters of datastores, which are commonly referred to as storage pods.

The management server 106 operates to monitor and manage the host computers H-1, H-2 ... H-M of the clusters C-1, C-2 ... C-N and/or the storage 104 of the distributed computer system 100. The management server may be configured to monitor the current configurations of the host computers and the clients running on the host computers, for example, virtual machines (VMs). The monitored configurations may include hardware configuration of each of the host computers, such as CPU type and memory size, and/or software configurations of each of the host computers, such as operating system (OS) type and installed applications or software programs. The monitored configurations may also include clustering information, i.e., which host computers are included in which clusters. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource settings, such as limit, reservation, entitlement and share values for various resources, e.g., CPU, memory, network bandwidth and storage, which are consumed by the clients.

The management server 106 may also be configured to monitor the current configuration of the storage 104, including the physical storage devices 110 and the datastores DS-1, DS-2 ... DS-X of the storage. The monitored storage configuration may include storage device configuration, which may include the number of storage devices in the storage, the device type of the storage devices, such as solid-state devices (SSDs) and hard disks, and storage capacity of each of the storage devices. The monitored storage configuration may also include datastore configuration, such as storage capacity of each of the datastores and connections and associations between the datastores and the host computers H-1, H-2 ... H-M and/or the clients running on the host computers.

The management server 106 may also be configured to monitor the current usage of resources by the clients, the host computers H-1, H-2 ... H-M and the clusters C-1, C-2 ... C-N of host computers. For example, the management server may monitor CPU processing usage, memory usage, network usage and storage usage of the clients. The management server may also be configured to store the usage of resources by the clients, the host computers and the clusters of host computers to maintain historical resource usage information. The historical resource usage information can then be used to develop various resource usage statistics for the individual clients, the individual host computers and the individual clusters of host computers.

The management server 106 may also be configured to perform various operations to manage the clients, the host computers H-1, H-2 ... H-M, the clusters C-1, C-2 ... C-N of host computers and the storage 104. As an example, the management server may be configured to initially place new clients onto one or more of the host computers in particular clusters and move existing clients to different host computers and/or different clusters. The management server can assign software processes to the host computer clusters in a manner that balances the loads of the software processes running on the host computer clusters. Processes, such as VMs, can be balanced based on allocation policies, resource demand, and the availability of resources provided by the host computer clusters. Balancing can be applied to computer resources such as processor time, i.e., CPU cycles, memory space, network bandwidth (including any type of input/output or bus bandwidth), storage space, power consumption, cache space, software licenses, and so on. To effectively balance the computing resources, a running VM can be migrated from one host computer cluster to another, in a process that is known as live VM migration. As another example, the management server may be configured to power down particular clients and/or host computers to conserve power and/or resources.

In order to perform these various operations, the management server 106 may maintain requirements and preferences for the clients with respect to the host computers and the datastores. These requirements and preferences may include affinity or anti-affinity rules for some of the clients, which may be mandatory or preferential. For example, these affinity or anti-affinity rules may include rules that specify which clients should run on the same host computer or be kept on separate host computers. As another example, these affinity or anti-affinity rules may include rules that specify which host computers are acceptable to clients and which host computers are not. The management server may be configured or programmed to perform other operations to manage the distributed computer system 100. The management server may be a physical computer system with at least one processor, memory and other components commonly found in a computer system, such as the host computer 200 shown in FIG. 2. Alternatively, the management server may be a software process executed by one or more processors of a physical computer system. In an implementation, the management server is a VMware vCenter™ server with at least some of the features available for such server.

Figure 3:
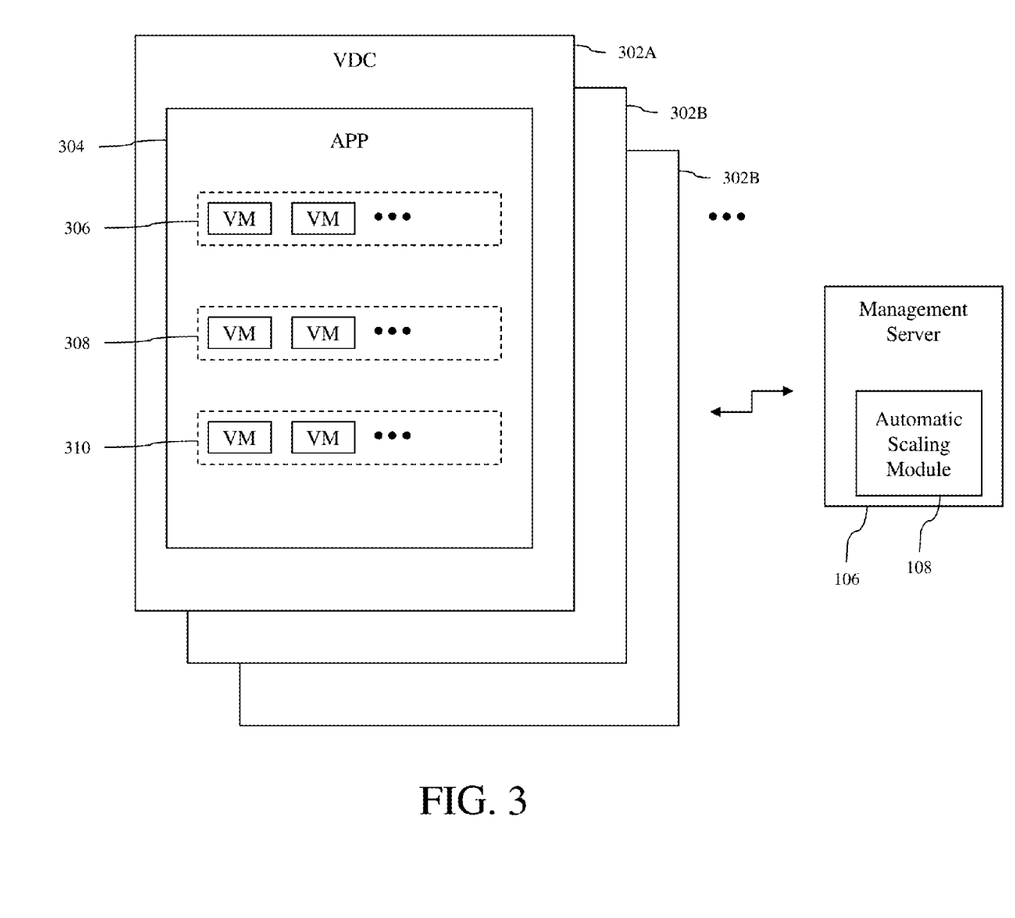
FIG. 3 illustrates virtual data centers that can support one or more multi-tier applications, wherein each tier of the multi-tier application is executed by one or more virtual machines, in accordance with an embodiment of the invention.

As illustrated in FIG. 3, at least some of the VMs running on the host computers H-1, H-2 . . . H-M and at least some of the data stores (not shown in FIG. 3) defined in the storage 104 support one or more virtual data centers 302. Each virtual data center may be configured to host one or more multi-tier applications, which are executed by some of the virtual machines running on the host computers. Multi-tier applications may utilize the different tiers to perform different functions. As an example, in FIG. 3, a multi-tier application 304 running on the virtual data center 302A is shown to be an application with three tiers 306, 308 and 310. The tier 306 may be configured and designated to perform web server functionality. The tier 308 may be configured and designated to perform application server functionality. The tier 310 may be configured and designated to perform database server functionality. For each tier of the multi-tier application, one or more virtual machines perform the functionality of that tier. As workload on the different tiers of the multi-tier application changes, the VMs executing the functionalities of the tiers may become over-utilized or under-utilized, which can degrade the performance of the multi-tier application and/or decrease the efficiency of the VMs. As described in more detail below, the automatic scaling module 108 of the management server 106 operates to automatically scale the multi-tier application as needed by adding or deleting virtual machines executing the multi-tier application.

Figure 4:
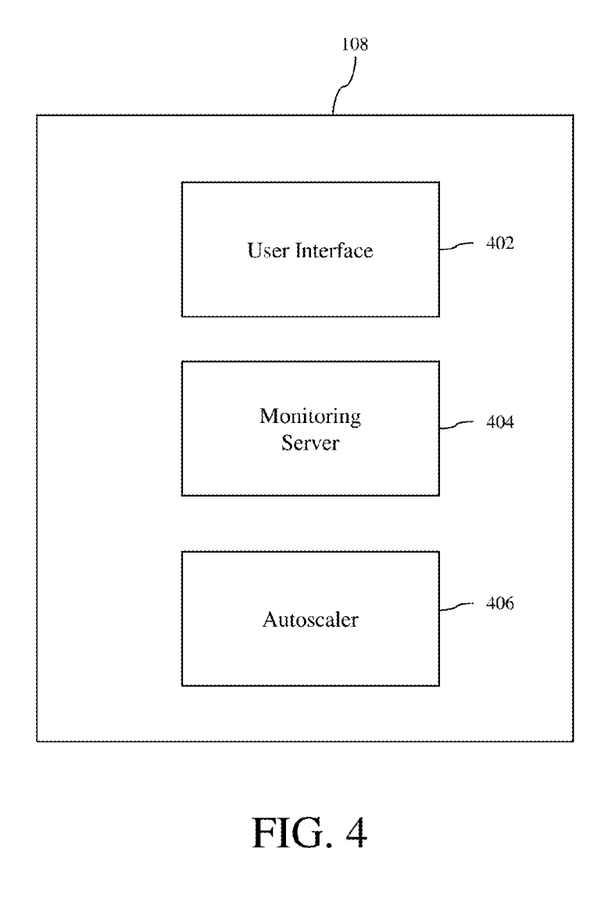
FIG. 4 is a block diagram illustrating components of an automatic scaling module in accordance with an embodiment of the invention.

Turing now to FIG. 4, components of the automatic scaling module 108 in accordance with an embodiment of the invention are illustrated. The automatic scaling module includes a user interface 402, a monitoring server 404 and an autoscaler 406. These components of the automatic scaling module may be implemented as software programs running on the management server. However, in other embodiments, the components of the automatic scaling module may be implemented using any combination of software and hardware.

The user interface 402 allows a user of the automatic scaling module 108 to input the multi-tier topology of the multi-tier applications that are to be automatically scaled by the automatic scaling module. The multi-tier topology of a multi-tier application may include the number of tiers included in the multi-tier applications and their relationships with respect to each other. As an example, the topology of a multi-tier e-commerce application may indicate that there are three tiers in the application: a web server tier, an application server tier and a database server tier. The multi-tier e-commerce application topology may also indicate that an input to the application is processed sequentially from the web server tier to the application server tier and then to the database server tier. The user interface can be any type of a user interface that allows a user to input data. In an embodiment, the user interface may be implemented as a web application so that the user can input the multi-tier application topology via the Internet.

The monitoring server 404 collects the operational metrics from the monitoring agents 236 of the various VM supporting a multi-tier application. The operational metrics may include resource utilization metrics and performance metrics with respect to the VMs supporting the multi-tier application. The operational metrics may be received from the monitoring agents on a periodic basis. The monitoring server gathers the received operational metrics and may store the data in a database. The monitoring server may format the received metric data so that the data can be readily used by the autoscaler 406. In an embodiment, the monitoring server may be a Hyperic server.

The autoscaler 406 performs an autoscaling analysis on the multi-tier application to determine whether one or more tiers of the application should be scaled, i.e., increase or decrease the number of VMs operating at those tiers. As described in more detail below, the autoscaling analysis performed by the autoscaler is based on reinforced learning using the resource metrics collected by the monitoring server. The results of the autoscaling analysis is then used to add or delete VMs in one or more tiers of the application to properly scale the multi-tier application so that the application can run in an efficient manner. In an embodiment, the adding or deleting of VMs for one or more tiers of the multi-tier application is performed by other components of the management server 106.

As noted above, the autoscaling analysis performed by the autoscaler 406 is based on reinforced learning. A reinforced learning involves an agent that automatically learns from an environment. The agent interacts with the environment by applying an action and then learning from the reward (positive or negative) awarded by the environment. At each time interval t, the environment provides the current state $s_t$ to the agent. The agent applies an action $a_t$ and receives a reward $r_{t+1}$ and the environment moves to the next state $s_{t+1}$. The agent then chooses the action based on a "policy" denoted with $\pi_t$. The objective of the agent is to learn the optimal policy to achieve maximum reward in the long run.

The autoscaling analysis performed by the autoscaler 406 uses a reinforced learning approach in order to make appropriate recommendations for proper scaling of the multi-tier application. The autoscaling analysis solves the problem of how to ensure that the multi-tier application operates at a desired performance level, e.g., satisfies a service level objective (SLO), by automatically scaling the VMs executing the multi-tier application in and out, while minimizing usage of resources. This autoscaling problem and its solution in accordance with embodiments of the invention are described below.

For a multi-tier application, the resource configuration at time t can be defined as $\vec{u}_t$, which is a vector of total number of VMs ($nvm_t$) and resource utilizations ($\vec{v}_t$), where $\vec{v}_t$ is a vector of usage of different resources, such as CPU, memory, storage and network resource. The resource utilization for each resource is calculated as a ratio of total consumed and total configured size for all VMs. In addition, a limit for the VMs is defined as $nvm_{limit}$, which determines the maximum total number of VMs the multi-tier application is allowed to consume. The application performance can be represented as $\vec{y}_t$, which is a vector of the individual tier performance ($y_t^{tier}$) (e.g. MySQL tier latency) and specifies the end-to-end performance of the multi-tier application. The service level objective (SLO) for the multi-tier application can be defined as $y_{ref}$. The state in this autoscaling problem can be represented as a combination of the current resource configuration and the application performance, which can be expressed as $s_t=(\vec{u}_t, \vec{y}_t)$. The input workload is not included in this formulation since the workload cannot be directly observed. However, the workload can be indirectly represented by the application performance ($\vec{y}_t$). The actions in the autoscaling problem include either scaling out or in VMs in a particular tier represented by a$_t$=(tier, howmany, up|down), where tier specifies the particular tier of the multi-tier application, howmany specifies the number of VMs to be scaled, up specifies whether one or more VMs should be added, and down specifies whether one or more VMs should be deleted.

The total expected return ($R_t$) can be defined as a function of the individual rewards at each future time interval with a discounting factor of γ. Intuitively, the discount factor γ allows rewards from previous intervals to be counted towards the overall return, since the goal of the autoscaler 406 is to maximize overall return rather than immediate reward. The total expected return can be expressed as:

$$R_t = \Sigma_{k=0}^{\infty} \gamma^k r_{t+k+1}. \qquad \text{(Equation 1)}$$

Figure 5:
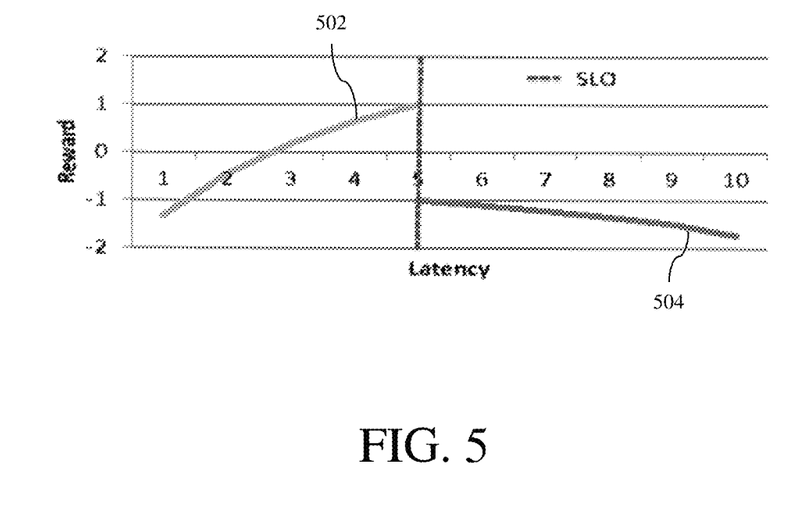
FIG. 5 shows a reward function in accordance with an embodiment of the invention.

The reward gained by taking an action is a function of the SLO, the application performance and the resource usage. If the multi-tier application is meeting the SLO (e.g. latency<200 ms, throughput>1000 reqs/sec), then the environment awards a positive reward. However, it is not desirable for the multi-tier application to consume too much of the resources (e.g. when latencies are significantly below the SLO). To penalize the excessive usage of resources, the environment provides a negative reward (or penalty) if the application is exceeding the SLO by a wide margin. However, if the application is not meeting the SLO, a negative reward is provided to discourage the action taken. The autoscaling analysis performed by the autoscaler 406 uses two concave functions to calculate the rewards. FIG. 5 illustrates an example of the rewards for various latencies using the two concave functions 502 and 504, which are to the left and to the right of the SLO at 5 units, respectively. The two concave functions meet at the SLO value so that reward scores decreases as the performance of the multi-tier application moves further away from the SLO. The autoscaling analysis computes the reward score by combining the application performance and the resource configuration $\vec{u}_t$. The resource configuration contains the number of VMs and the resource utilizations. The autoscaling analysis uses the maximum constrained item in $\vec{u}_t$ in computing the score. The computed score provides a negative reward for not meeting SLOs and a positive reward for meeting SLOs, while minimizing usage of resources.

In one particular implementation, the autoscaler executes the following algorithm to compute the reward for each possible action that can be taken.

---

Algorithm: Reward Computation

1    $y_{norm} = \dfrac{y_t}{y_{ref}}$;

2    $\vec{v}_t$: resource utilizations ($v_{cpu}$, $v_{mem}$, $v_{storage}$, $v_{network}$);

3    $v_{resource}: \dfrac{\sum vm_{resource}^{consumed}}{\sum vm_{resource}^{configured}}$;

4    $score_{SLO} = \text{sgn}(1 - y_{norm}) * e^{|1 - y_{norm}|}$;

5    $u_{constrained} = \max\left(\dfrac{nvm_t}{nvm_{limit}}, v_{cpu}, v_{mem}, v_{storage}, v_{network}\right)$;

---

Algorithm: Reward Computation

6    $score_u = e^{1 - u_{constrained}}$;

7    $reward = score_{SLO} * score_u$;

---

In the above algorithm, normalized application performance is defined as measured application performance over the SLO for the application (line 1). The vector $\vec{v}_t$ is defined as utilizations of the CPU, memory, storage and network resources (line 2). Each resource utilization is defined as the sum of the resource consumed by all the VMs over the sum of the resource allotted to all the VMs (line 3). A first function with respect to SLO is defined using the sign function of the normalized application performance (line 4). A second function with respect to resource configuration is defined (line 6) using the maximum constrained item in the resource utilizations (line 5) to take the utilization of the most constrained resource as the one number to use in the utilization. The reward is computed using by multiplying the first and second functions (line 7).

In an embodiment, the autoscaling analysis performed by the autoscaler 406 solves the autoscaling problem by using a particular reinforced learning, Q-learning, which is a temporal different (TD) learning technique. The autoscaling analysis first defines the value of taking an action a in a state s under a policy π as $Q^\pi(s, a)$, which denotes the expected value from taking the action a in the state s. This action-value function Q can be expressed as follows:

$$Q^\pi(s, a) = E_\pi\{R_t \mid s_t = s, a_t = a\} \qquad \text{(Equation 2)}$$
$$= E_\pi\left\{\sum_{k=0}^{\infty} \gamma^k r_{t+k+1} \;\middle|\; s_t = s, a_t = a\right\}.$$

The autoscaling analysis performed by the autoscaler 406 finds the optimal value of the action-value function Q using Q-learning. The autoscaling analysis first initializes the Q value for the starting state to zero. For each interval, the autoscaling analysis iteratively updates the Q values in a Q table as per Q-learning technique, where each Q value in the Q table corresponds to a particular state-action combination, i.e., a quality value for taking a particular action from a particular state. Thus, the Q table initially includes Q values that are all equal to zero. As the Q values are updated, The action is chosen from a policy π, which is described below. The Q-learning technique may use a learning factor α, which can be changed to favor exploration or exploitation. Larger values of α favor exploitation by sampling using the Q value that has been learnt so far. Smaller values of α update the Q values with what has been learnt by applying the state. The Q-learning technique may also use a discount factor γ for the reward to discount the rewards see in previous intervals.

In one particular implementation, the autoscaler 406 executes the following algorithm to compute the reward for each possible action that can be taken.

---

Algorithm: Q-Learning 1 initialization;
2 Q ← 0;
3 $s_t$: current state;
4 r(s, a): reward function;

-continued

---
Algorithm: Q-Learning
---

5  α: learning rate 0 ≤ 1;
6  γ: discounting factor 0 ≤ 1;
7  for each interval do
8  |   $a_t$ = Choose an action according to policy π;
9  |   $Q^+$ ($s_t$, $a_t$) = α * Q ($s_t$, $a_t$) + (1 − α) (r($s_t$, $a_t$) +
      γ * (argmax$_a$ Q($s_{t+1}$, a')));
10 |   $Q_\Delta$ = Max($Q_\Delta$, |$Q^+$($s_t$, $a_t$) − Q($s_t$, $a_t$)|);
11 end

---

In the above algorithm, the Q value for the starting state is initialized to zero (lines 1-3). Current state, the reward function, the learning rate and the discounting factors are then defined (lines 4-6). Then, for each interval (line 7), the algorithm iteratively chooses an action according to policy π (line 8). The algorithm then computes a new Q value for the action, $Q^+$, where the term α*Q($s_t$, $a_t$) is the previous Q value updated by multiplying with α and the term (1−α)(r($s_t$, $a_t$)+γ*(argmax$_a$Q($s_{t+1}$, a')) is the correction to be done to the existing Q value (line 9). These two terms represent the existing and learned values. The algorithm then updates the Q value for the state-action combination, $Q_\Delta$, only if the absolute value of the difference between the new Q value and the previous Q value, Q($s_t$, $a_t$), is greater than the previous Q value for the state-action combination (line 10).

In typical Q-learning algorithms, ε-greedy policy is used to determine the next action to be taken. In ε-greedy policy, an action with the best Q value is chosen with 1−ε probability and a random action is chosen with ε probability. The ε values can be increased or decreased to give preference to exploration versus exploitation. However, the auto-scaling problem has a large state space, making it difficult to find an optimal action. Another challenge is the time taken for provisioning a new VM, which may be in the order of minutes. As a result, the above Q-learning algorithm may take a long time to converge and may not be able to adapt to changes quickly. In an embodiment, in order to avoid these problems, a few heuristics are defined to bootstrap Q-learning and speed up learning process. The following list of heuristics is for SLOs specified as latency <SLO. However, similar heuristics are applicable to throughput as well.

No-change policy: Stay unchanged when latency for all requests below β*SLO or above 1−β*SLO. This is a policy to make sure that, the autoscaler 406 does not aggressively scale up or down, for slight variations from the SLO. The value β can be changed to control the aggressiveness with which to stay closer to the SLO.

Scale-up policy: Scale up, when average latency for one percentile of requests is above β*SLO. The autoscaler 406 chooses the tier with
  max increasing errors within the history window W (e.g., last 32 actions);
  greatest latency increase during the history window W; and
  highest per-tier max latency.

Scale-down policy: Scale down, when average latency for 99 percentile of requests is below 1−β*SLO. The autoscaler 406 chooses the tier with
  greatest latency decrease during the history window W; and
  lowest per-tier max latency.

In the above policies, if different policies suggest different actions, then the autoscaler 406 chooses one of the actions randomly. Since these policies are heuristics, these policies allow the autoscaler to explore various states to augment the reinforcement learning. In an embodiment, the overall policy of the reinforced learning is defined as a combination of reinforced learning and heuristics. When the autoscaler is initiated or when the system behavior changes (due to workload changes), heuristics dominate the autoscaling analysis of the autoscaler. As the autoscaling analysis learns from the actions taken due to heuristics, the number of explored actions increases and reinforced learning becomes more predominant, eventually turning to a policy similar to the ε-greedy policy.

In one particular implementation, the autoscaler 406 executes the following algorithm to determine whether to use heuristics or reinforced learning.
  Algorithm: Self-Adaptive Policy Maker
  1 ε=(the number of actions explored so far)/(the number of possible actions from s);
  2 With probability ε: use heuristics;
  3 With probability 1−ε: use Q table to find action a;

In the above algorithm, a parameter ε is defined as the number of actions explored over the number of possible actions from the current state s (line 1). Using probabilities, either heuristics or reinforced learning is used to scale VMs in a particular tier of the multi-tier application. With probability ε, heuristics is used (line 2). With probability 1−ε, the Q table is used to find the next action a (line 3).

When determining the next action, it is theoretically possible for the autoscaler 406 to explore all actions involving one or more scale out or scale in operations. However, if all actions are explored, the autoscaling operation becomes impractical since provisioning operations may take too much time and the state space will become too large. By experimentation, it was discovered that one scale out/in (i.e., adding or deleting one VM) provides practical results. In an embodiment, the autoscaler performs the autoscaling analysis based on one scale out/in operations.

In some situations, the performance of the multi-tier application may not be improving even though the autoscaling operation is being performed. Such situation may occur, for example, if the multi-tier application is not configured correctly or the autoscaler is hitting a system limit on scalability. In an embodiment, if the performance of the multi-tier application is not improving, e.g., when the ΔQ for all the possible actions from current action is nearly zero, the autoscaler 406 stops the scaling operation and reports an alarm.

When workload changes, the autoscaler 406 will simply follow the learned policy, which may take a long time to adapt to the changing conditions. To overcome this problem, in an embodiment, the autoscaler marks the Q entry for a learned action as empty, if that learned action generates nearly zero or reverse effect (a negative value). This forces learning for this entry in the next interval. Though this may cause temporary punishment for some learned values, the autoscaler is able to adapt to new workloads quickly. The resetting of Q entries may be controlled by specifying a percentage of learned actions that can fail before the Q entries are reset.

Figure 6:
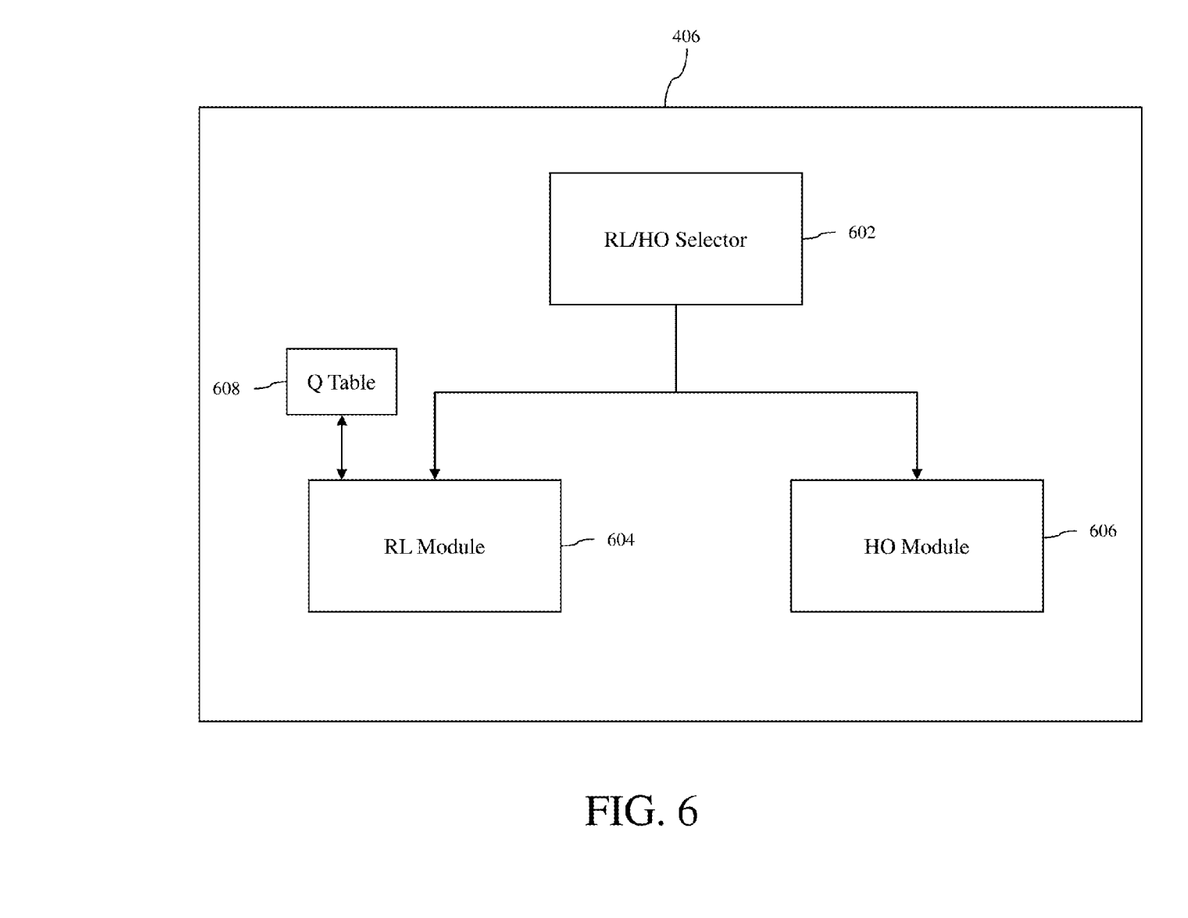
FIG. 6 is a block diagram illustrating components of an autoscaler of the automatic scaling module in accordance with an embodiment of the invention.

Turing now to FIG. 6, components of the autoscaler 406 in accordance with an embodiment of the invention are illustrated. The autocaler includes a reinforced learning (RL)/heuristic operation (HO) selector 602, a RL module 604 and a HO module 606. These components of the autoscaler may be implemented as software programs running on the management server. However, in other embodiments, the components of the autoscaler may be implemented using any combination of software and hardware.

The RL/HO selector 602 operates to select whether reinforced learning or heuristic operation is to be applied to determine the next scaling action for the current state of the multi-tier application. This selection is made based on a predefined policy. In an embodiment, the RL/HO selector uses probabilities based at least partly on the number of scaling actions already taken. In a particular implementation, the RL/HO selector applies the self-adaptive policy making algorithm described above.

The RL module 604 operates to apply reinforced learning to recommend the next scaling action. In an embodiment, the RL module applies Q learning process, and thus, makes scaling action recommendations based on Q values in a Q table 608. As part of the Q learning process, the RL module also updates the Q values after the scaling action has been selected. In a particular implementation, the RL module applies the Q learning algorithm described above.

The HO module 606 operates to apply a heuristic operation to recommend the next scaling action. In an embodiment, the HO module applies one of predefined heuristics based on latency and a predefined application performance level. In a particular implementation, the HO module applies one of the no-change, scale-up and scale-down policies described above.

As described above, the multi-tier application has a large state space because the state of the multi-tier application is defined as a combination of resource configuration and application performance $(s_t = (\vec{u}_t, \vec{y}_t))$. Thus, every small change in the application performance and the resource configuration (to a lesser extent) of the multi-tier application creates a new state for the multi-tier application, which may result in unmanageable number of states for the autoscaling analysis. One solution is to use only the resource configuration $\vec{u}_t$ as part of the state. However, this solution will only work for a static workload. Any change in the workload will produce different actions from a particular state at different times. Another option is to classify the application performance into various regions, for example, 25% below the SLO, 25% above the SLO and so on. Although such classification gives a better state representation, it has been found that choosing the regions for practical workloads is difficult and requires manual input, which will make the autoscaling operation performed by the autoscaler not a fully automated scaling solution.

Figure 7:
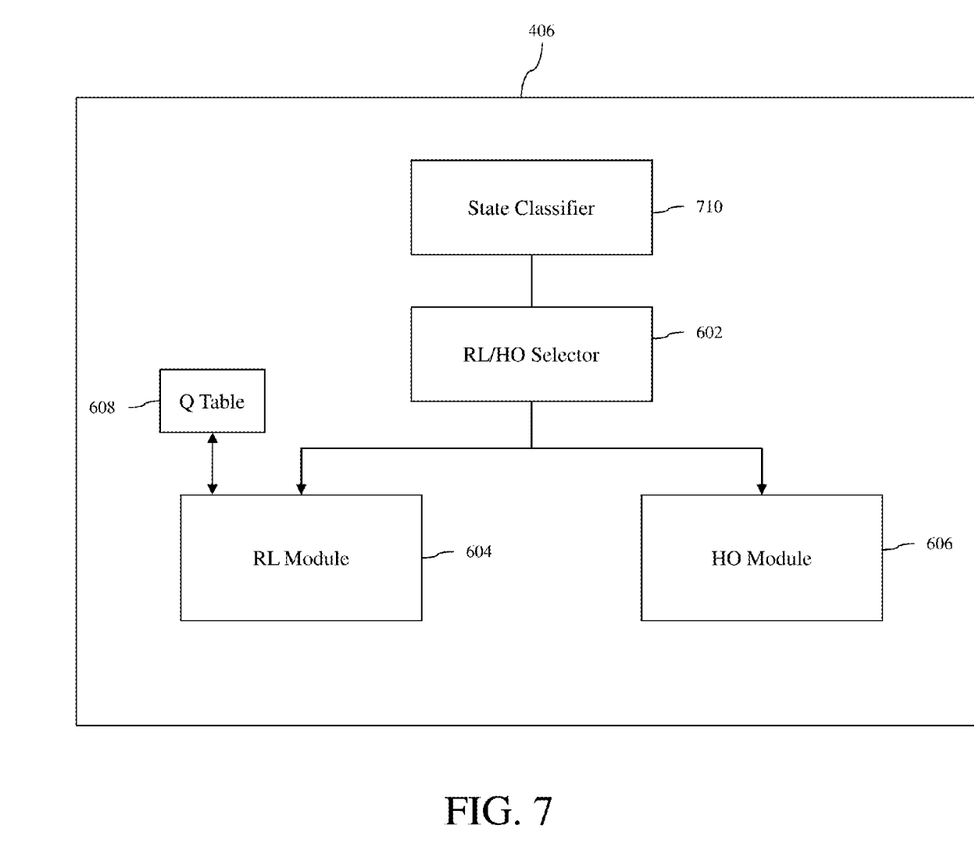
FIG. 7 is a block diagram illustrating components of the autoscaler of the automatic scaling module in accordance with another embodiment of the invention.
Figures 8A, 8B:
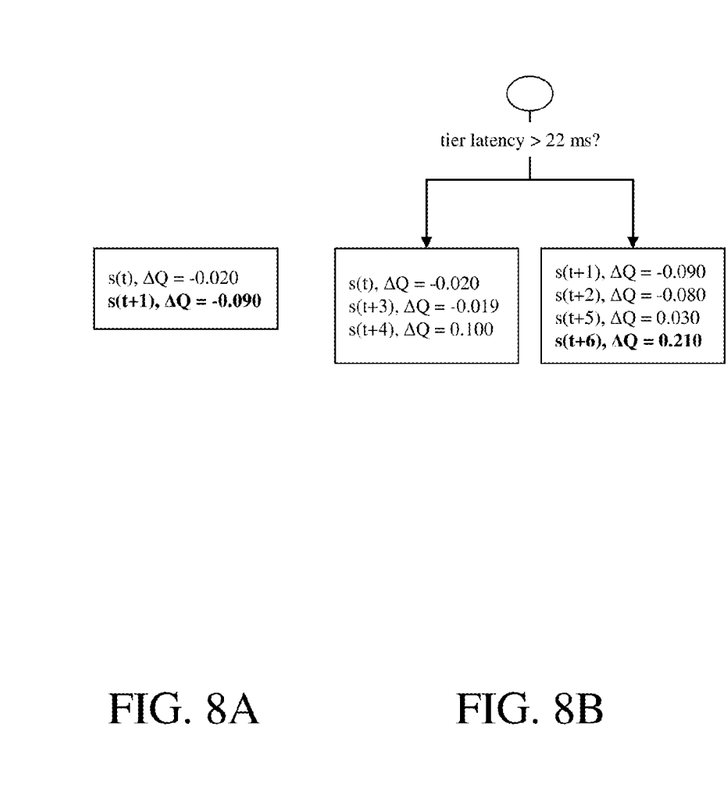
FIGS. 8A, 8B and 8C illustrate a decision tree classification performed by a state classifier of the auto scaler in accordance with an embodiment of the invention are illustrated.
Figure 8C:
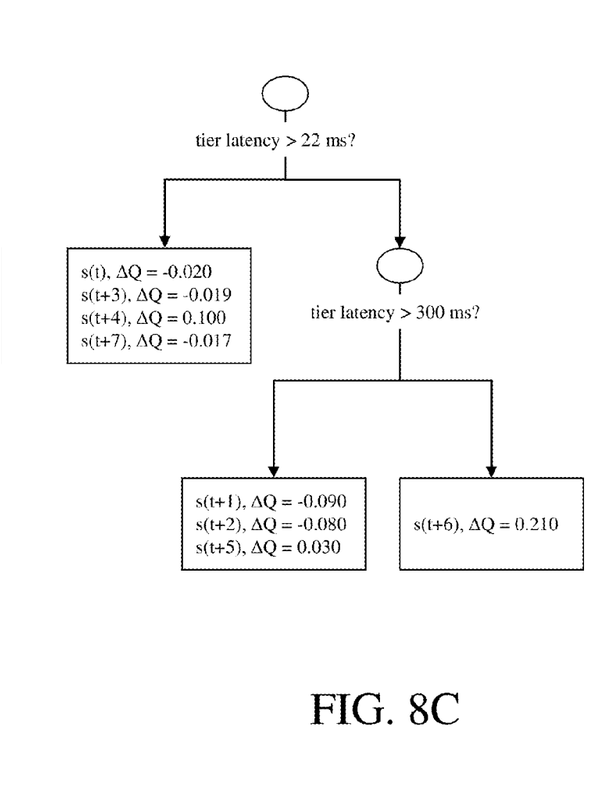

In an embodiment, as illustrated in FIG. 7, the autoscaler 406 include a state classifier 710 that operates to group similar states into clusters. When a new state is encountered, the new state is compared to existing clusters and is either merged with an existing cluster or a new cluster is created. The state classifier may be a decision tree classifier that uses a top-down induction of decision trees. In decision tree classification, each non-leaf node splits the state space below into two subspaces. The splitting variable can be any variable in $\vec{u}_t$ and $\vec{y}_t$. Each leaf node is a state cluster which contains a few states and a history table which logs the actions taken on the states in this cluster and the corresponding Q-value changes, i.e., $\Delta Q = Q_{current} - Q_{previous}$. For a specific action in the history table, if the standard deviation of $\Delta Q$ exceeds a certain threshold, the state is split into a new branch and two leaf nodes. The idea is to split the state cluster if the new state falls far beyond the mean of the state cluster. To perform the splitting, the state classifier chooses a variable and a splitting value for the variable, which splits the original cluster into two, while minimizing the standard deviation of $\Delta Q$ for the previous action which triggered the splitting threshold. FIGS. 8A-8C illustrate the decision tree classification performed by the class classifier. Initially, a single cluster contains the state $s_t$ with $\Delta Q = -0.020$, as shown in FIG. 8A. Then, the state $s_{t+1}$ with $\Delta Q = -0.090$ joins the cluster (shown in bold in FIG. 8A), and causes a split into two clusters, as shown in FIG. 8B, due the significant difference in $\Delta Q$. The variable chosen for the split is the tier latency. After the split, more states are reached and the states from $s_{t+2}$ to $s_{t+6}$ are placed in either of the two clusters as per their tier latencies. When the state $s_{t+6}$ is added to the second cluster, this state causes another split, producing the tree shown in FIG. 8C. As further illustrated in FIG. 8C, the next state $s_{t+7}$ generated after this split falls into the first cluster.

Figure 9:
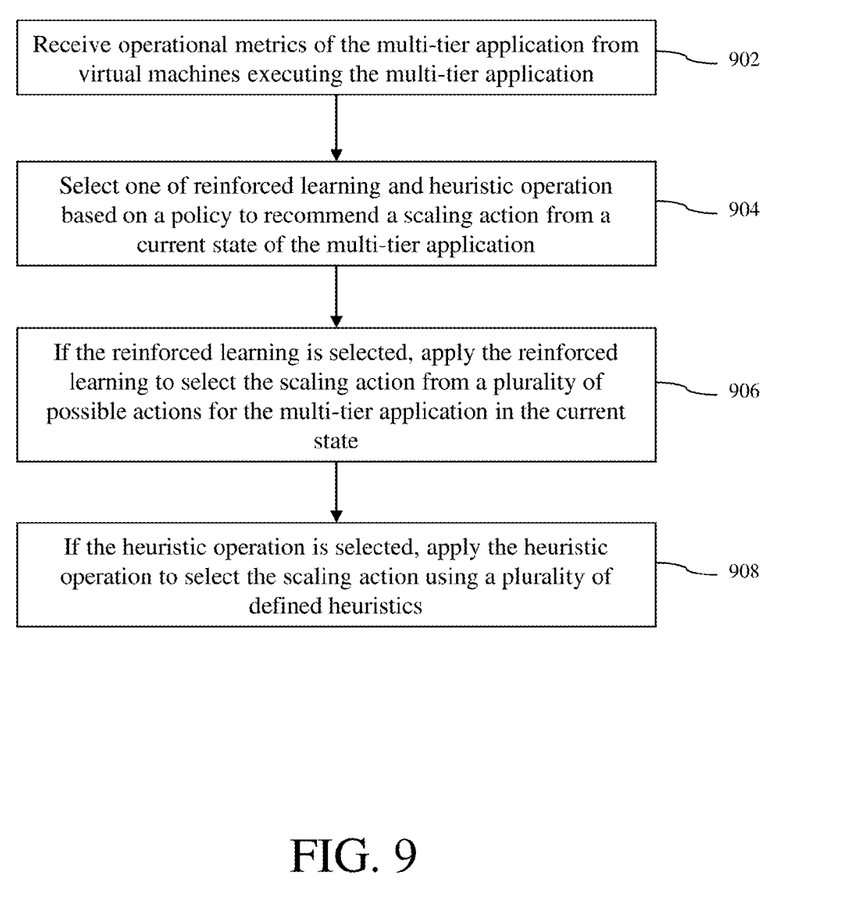
FIG. 9 is a process flow diagram of method for automatically scaling a multi-tier application in accordance with an embodiment of the invention.

A method for automatically scaling a multi-tier application in accordance with an embodiment of the invention is now described with reference to the flow diagram of FIG. 9. At block 902, operational metrics of the multi-tier application are received from virtual machines executing the multi-tier application, wherein each tier of the multi-tier application is supported by at least one virtual machine. At block 904, one of reinforced learning and heuristic operation is selected based on a policy to recommend a scaling action from a current state of the multi-tier application, where the current state of the multi-tier application is dependent on the operational metrics. At block 906, if the reinforced learning is selected, the reinforced learning is applied to select the scaling action from a plurality of possible actions for the multi-tier application in the current state. At block 908, if the heuristic operation is selected, applying the heuristic operation is applied to select the scaling action using a plurality of defined heuristics.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blue-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for automatically scaling a multi-tier application, the method comprising:
receiving operational metrics of the multi-tier application from virtual machines executing the multi-tier application, wherein each tier of the multi-tier application is supported by at least one virtual machine;
selecting one of reinforced learning and heuristic operation to recommend a scaling action from a current state of the multi-tier application, the current state of the multi-tier application being dependent on the operational metrics;
if the reinforced learning is selected, applying the reinforced learning to select the scaling action from a plurality of possible actions for the multi-tier application in the current state; and
if the heuristic operation is selected, applying the heuristic operation to select the scaling action using a plurality of defined heuristics.

2. The method of claim 1, wherein selecting one of the reinforced learning and the heuristic operation includes selecting of one of the reinforced learning and the heuristic operation using probabilities based on a ratio between the number of scaling actions that have been explored and the number of possible scaling actions from the current state.

3. The method of claim 1, wherein applying the reinforced learning includes applying Q learning to select the scaling action using a Q table with Q values, each of the Q values corresponding to a combination of a particular state and a particular scaling action.

4. The method of claim 3, wherein applying the Q learning includes updating a Q value in the Q table for the current state of the multi-tier application and the selected scaling action using an action-value function.

5. The method of claim 4, wherein updating the Q value includes computing a reward score for the current state of the multi-tier application and the selected scaling action using a reward function, and applying the reward score to the action-reward function.

6. The method of claim 5, wherein the reward function includes two concave functions that meet at a predefined application performance level, the reward function providing reward scores that decrease as the performance of the multi-tier application moves further away from the predefined application performance level.

7. The method of claim 1, wherein applying the heuristic operation includes selecting one of no-change policy, scale-up policy and scale-down policy based on latency of the multi-tier application to process requests.

8. The method of claim 7, wherein selecting one of the no-change policy, the scale-up policy and the scale-down policy further includes selecting a tier of the multi-tier application to scale based on a history window defined by a number of scaling actions already taken.

9. The method of claim 1, further comprising grouping states of the multi-tier application into clusters using decision tree classification based on a splitting variable.

10. The method of claim 1, wherein the operational metrics include resource utilization metrics and application performance metrics of the multi-tier application.

11. An automatic scaling module for a multi-tier application executed on a distributed computer system, wherein each tier of the multi-tier application is supported by at least one virtual machine, the automatic scaling module comprising:

a selector configured to select one of reinforced learning and heuristic operation to recommend a scaling action from a current state of the multi-tier application;
a reinforced learning module configured to apply the reinforced learning to select the scaling action from a plurality of possible actions for the multi-tier application in the current state when the reinforced learning is selected; and
a heuristic operation module configured to apply the heuristic operation to select the scaling action using a plurality of defined heuristics when the heuristic operation is selected.

12. The automatic scaling module of claim 11, wherein the selector is configured to select one of the reinforced learning and the heuristic operation using probabilities based on a ratio between the number of scaling actions that have been explored and the number of possible scaling actions from the current state.

13. The automatic scaling module of claim 11, wherein the reinforced learning module is configured to select the scaling action using a Q table with Q values, each of the Q values corresponding to a combination of a particular state and a particular scaling action.

14. The automatic scaling module of claim 13, wherein the reinforced learning module is further configured update a Q value in the Q table for the current state of the multi-tier application and the selected scaling action using an action-value function.

15. The automatic scaling module of claim 14, wherein the reinforced learning module is configured compute a reward score for the current state of the multi-tier application and the selected scaling action using a reward function, and applying the reward score to the action-reward function to update the Q value.

16. The automatic scaling module of claim 15, wherein the reward function includes two concave functions that meet at a predefined application performance level, the reward function providing reward scores that decrease as the performance of the multi-tier application moves further away from the predefined application performance level.

17. The automatic scaling module of claim 11, wherein the heuristic operation module is configured to selected one of no-change policy, scale-up policy and scale-down policy based on latency of the multi-tier application to process requests.

18. The automatic scaling module of claim 17, wherein the heuristic operation module is further configured to select a tier of the multi-tier application to scale based on a history window defined by a number of scaling actions already taken.

19. The automatic scaling module of claim 11, further comprising a state classifier configured to group states of the multi-tier application into clusters using decision tree classification based on a splitting variable.

20. The automatic scaling module of claim 11, further comprising a monitoring server configured to receiving operational metrics of the multi-tier application from the virtual machines executing the multi-tier application, wherein at least some of the operational metrics are used to define the state of the multi-tier application and wherein the operational metrics include resource utilization metrics and application performance metrics of the multi-tier application.

21. A computer-readable storage medium containing program instructions for automatically scaling a multi-tier application, wherein execution of the program instructions by one or more processors causes the one or more processors to perform steps comprising:

receiving operational metrics of the multi-tier application from virtual machines executing the multi-tier application, wherein each tier of the multi-tier application is supported by at least one virtual machine;

based on a policy related to the operational metrics, selecting one of reinforced learning and heuristic operation to recommend a scaling action from a current state of the multi-tier application, the current state of the multi-tier application being dependent on the operational metrics;

if the reinforced learning is selected, applying the reinforced learning to select the scaling action from a plurality of possible actions for the multi-tier application in the current state; and if the heuristic operation is selected, applying the heuristic operation to select the scaling action using a plurality of defined heuristics.

22. The computer-readable storage medium of claim 21, wherein selecting one of the reinforced learning and the heuristic operation includes selecting of one of the reinforced learning and the heuristic operation using probabilities based on a ratio between the number of scaling actions that have been explored and the number of possible scaling actions from the current state.

23. The computer-readable storage medium of claim 21, wherein applying the reinforced learning includes applying Q learning to select the scaling action using a Q table with Q values, each of the Q values corresponding to a combination of a particular state and a particular scaling action.

24. The computer-readable storage medium of claim 23, wherein applying the Q learning includes updating a Q value in the Q table for the current state of the multi-tier application and the selected scaling action using an action-value function, including computing a reward score for the current state of the multi-tier application and the selected scaling action using a reward function.

25. The computer-readable storage medium of claim 24, wherein the reward function includes two concave functions that meet at a predefined application performance level, the reward function providing reward scores that decrease as the performance of the multi-tier application moves further away from the predefined application performance level.

26. The computer-readable storage medium of claim 21, wherein applying the heuristic operation includes selecting one of no-change policy, scale-up policy and scale-down policy based on latency of the multi-tier application to process requests.

27. The method of claim 1, wherein selecting of one of the reinforced learning and the heuristic operation using the probabilities based on the ratio between the number of scaling actions that have been explored and the number of possible scaling actions from the current state comprises using the heuristic operation with a probability that is equal to the ratio between the number of scaling actions that have been explored and the number of possible scaling actions from the current state and using a Q table to find a next action with a probability that is equal to the difference between 1 and the ratio between the number of scaling actions that have been explored and the number of possible scaling actions from the current state.

* * * * *